(12) United States Patent
Sun et al.

(10) Patent No.: US 11,820,096 B2
(45) Date of Patent: Nov. 21, 2023

(54) MULTI PLATE SCREW PRESS SLUDGE DEWATERING MACHINE

(71) Applicant: SHANGHAI TECHASE ENVIRONMENT PROTECTION CO., LTD., Shanghai (CN)

(72) Inventors: Gangfan Sun, Shanghai (CN);
Daoguang Liu, Shanghai (CN);
Wenbiao Zhang, Shanghai (CN)

(73) Assignee: SHANGHAI TECHASE ENVIRONMENT PROTECTION CO., LTD., Shanghai (CN)

( * ) Notice: Subject to any disclaimer, the term of this patent is extended or adjusted under 35 U.S.C. 154(b) by 234 days.

(21) Appl. No.: 17/246,737

(22) Filed: May 3, 2021

(65) Prior Publication Data
US 2021/0253462 A1    Aug. 19, 2021

Related U.S. Application Data

(60) Division of application No. 16/057,824, filed on Aug. 8, 2018, now Pat. No. 11,034,603, which is a
(Continued)

(30) Foreign Application Priority Data

Feb. 22, 2016   (CN) .......................... 201620133263.4
Apr. 22, 2016   (CN) .......................... 201610256982.X

(51) Int. Cl.
*C02F 9/00*      (2023.01)
*B01D 29/64*    (2006.01)
(Continued)

(52) U.S. Cl.
CPC ............ *B30B 9/121* (2013.01); *B01D 29/014* (2013.01); *B01D 29/035* (2013.01);
(Continued)

(58) Field of Classification Search
CPC .......... C08L 59/02; C08L 27/18; C08L 71/02; C08K 7/06; B01D 2201/282;
(Continued)

(56) References Cited

U.S. PATENT DOCUMENTS 5,380,436 A  *  1/1995 Sasaki ....................... B30B 9/26
                                                                              210/383

FOREIGN PATENT DOCUMENTS

JP           2009235662 A   * 10/2009

* cited by examiner

*Primary Examiner* — Dirk R Bass
(74) *Attorney, Agent, or Firm* — JCIPRNET

(57) ABSTRACT

The present invention provides a multi plate screw press sludge dewatering machine and a helical shaft thereof. The multi plate screw press sludge dewatering machine includes fixed rings, movable rings, the helical shaft, a sludge inlet tank and a sludge discharging tank; the helical shaft adopts a variable diameter variable pitch helical shaft, a lead angle arrangement sequence of a helical blade of the whole helical shaft is gradual reduction from the sludge discharging tank to the sludge inlet tank, and the lead angle arrangement sequence is gradually reduced from 16°-22° to 6°-14°; a pitch of the helical shaft is gradually increased along a direction from the sludge inlet tank to the sludge discharging tank; a diameter of a shaft body of the helical shaft is gradually increased along with a direction of the sludge discharging tank from a ⅓ position of a shaft length; and blockage prevention plates are arranged on two sides of the bottom of the helical blade. The helical shaft in the present invention is specially designed, so that the pitch is more reasonable, a helical angle is gentler, frictional resistance when sludge passes through the helical shaft may be effectively reduced, and phenomena of shaft blockage and shaft sticking of the sludge may be reduced.

4 Claims, 10 Drawing Sheets

Related U.S. Application Data continuation of application No. PCT/CN2017/073970, filed on Feb. 17, 2017.

(51) Int. Cl.

| | |
|---|---|
| *B01D 29/03* | (2006.01) |
| *B01D 29/56* | (2006.01) |
| *B01D 29/35* | (2006.01) |
| *C08L 59/02* | (2006.01) |
| *B01D 29/01* | (2006.01) |
| *B01D 29/46* | (2006.01) |
| *B01D 29/68* | (2006.01) |
| *B01D 29/90* | (2006.01) |
| *B01D 36/02* | (2006.01) |
| *C02F 11/122* | (2019.01) |
| *C02F 11/125* | (2019.01) |
| *C08J 5/00* | (2006.01) |
| *C08L 71/02* | (2006.01) |
| *B30B 9/12* | (2006.01) |
| *C02F 11/14* | (2019.01) |
| *B29C 45/00* | (2006.01) |
| *B29K 105/12* | (2006.01) |
| *B29K 259/00* | (2006.01) |
| *B29K 307/04* | (2006.01) |
| *C02F 1/00* | (2023.01) |
| *C02F 1/52* | (2023.01) |

(52) U.S. Cl.
CPC ........... *B01D 29/356* (2013.01); *B01D 29/46* (2013.01); *B01D 29/56* (2013.01); *B01D 29/6476* (2013.01); *B01D 29/68* (2013.01); *B01D 29/90* (2013.01); *B01D 36/02* (2013.01); *C02F 9/00* (2013.01); *C02F 11/122* (2013.01); *C02F 11/125* (2013.01); *C08J 5/005* (2013.01); *C08L 59/02* (2013.01); *C08L 71/02* (2013.01); *B01D 2201/282* (2013.01); *B01D 2201/48* (2013.01); *B29C 45/0001* (2013.01); *B29K 2105/12* (2013.01); *B29K 2259/00* (2013.01); *B29K 2307/04* (2013.01); *C02F 1/004* (2013.01); *C02F 1/5281* (2013.01); *C02F 11/14* (2013.01); *C02F 2303/14* (2013.01); *C02F 2303/16* (2013.01); *C08J 2371/02* (2013.01); *C08J 2427/18* (2013.01)

(58) Field of Classification Search
CPC .............. B01D 2201/48; B01D 29/014; B01D 29/035; B01D 29/356; B01D 29/46; B01D 29/56; B01D 29/6476; B01D 29/68; B01D 29/90; B01D 36/02; B29C 45/0001; B29K 2105/12; B29K 2259/00; B29K 2307/04; C02F 11/122; C02F 11/125; C02F 11/14; C02F 1/004; C02F 1/5281; C02F 2303/14; C02F 2303/16; C02F 9/00; C08J 2371/02; C08J 2427/18; C08J 5/005

See application file for complete search history.

MULTI PLATE SCREW PRESS SLUDGE DEWATERING MACHINE

CROSS-REFERENCE TO RELATED APPLICATION

This is a divisional application of U.S. patent application Ser. No. 16/057,824, filed on Aug. 8, 2018, now pending. The application Ser. No. 16/057,824 is a continuation of International Application No. PCT/CN2017/073970, filed on Feb. 17, 2017, which claims the priority benefits of China Application No. 201620133263.4, filed on Feb. 22, 2016 and China Application No. 201610256982.X, filed on Apr. 22, 2016. The entirety of each of the above-mentioned patent applications is hereby incorporated by reference herein and made a part of this specification.

BACKGROUND OF THE INVENTION

1. Field of the Invention

The present invention belongs to the technical field of sludge dewatering and relates to multi plate screw press sludge dewatering machine.

2. Description of Related Art

Multi plate screw press sludge dewatering machine is a filtering driving device formed by stacking fixed rings and movable rings through which a helical shaft penetrates. Its front end is a concentration portion and its rear end is a dewatering portion. Filtering gaps formed between the fixed rings and the movable rings and a pitch of the helical shaft are gradually reduced from the concentration portion to the dewatering portion. A working principle of the multi plate screw press sludge dewatering machine is as follows: an adjustable-speed motor mounted on one side of a sludge outlet is started to drive the helical shaft to rotate; sludge is supplied through a sludge inlet, and the sludge is driven by a helical blade to enter an internal space between the movable rings and the fixed rings; since an internal diameter of the movable rings are smaller than an internal diameter of the fixed rings, the sludge pressurizes the movable rings to drive the movable rings to move between the fixed rings during rotation, and most of water flows to a filtrate recycling device through the gaps between the movable rings and the fixed rings in a movement process; the helical shaft rotates to drive the sludge from the concentration portion to the dewatering portion, and also continuously drives the movable rings to clean filtering gaps at the same time to prevent blockage; and the sludge is transported to the dewatering portion after being concentrated by the concentration portion, extremely high internal pressure is generated along with gradual reduction of the filtering gaps and the pitch and actions of press plates in an advancing process, a volume is kept reduced, and thus a purpose of full dewatering is achieved.

Existing multi plate screw press sludge dewatering machine has the following shortcomings.

1: A treatment range is relatively narrow: solid content of charged sludge of the equipment is actually required to be higher than or equal to 20,000 mg/L (that is, water content of the charged sludge is lower than or equal to 98%), and if the solid content of the charged sludge is lower than 20,000 mg/L (that is, the water content of the charged sludge is higher than 98%), water content of discharged sludge may be increased, a treatment capacity may be reduced, and working efficiency of the dewatering equipment is low.

2: For conventional multi plate screw press sludge dewatering machine, a lift angle (lead angle) of a helical blade of a helical shaft in a dewatering section is usually 8-13°, a lift angle arrangement sequence of the helical blade of the whole helical shaft is gradual reduction from a sludge inlet end to a sludge outlet end, and when the water content of the discharged sludge is relatively low, phenomena of sludge sticking to the shaft and jamming may occur.

3: A plastic lamination is usually adopted for a concentration section of the helical shaft, and is easy to break and inadequate in strength.

4: A helical bevel gear speed reducer and a worm-gear or gear speed reducer are usually adopted to provide driving power for the helical shaft, and are relatively high in speed reduction ratio, low in safety coefficient, heavy and inconvenient to maintain.

5: A lamination (movable rings and fixed rings) of the existing multi plate screw press sludge dewatering machine is mainly made from a metal material such as 304 stainless steel, the metal material such as the 304 stainless steel is poor in abrasion resistance and corrosion resistance, and its service life is usually about 1 year, so that an application range and service life of the multi plate screw press sludge dewatering machine are limited, requirements on the service life and performance of the equipment cannot be met, and a requirement of a user may not be met.

6: According to the existing multi plate screw press sludge dewatering machine, as shown in FIG. 4, FIG. 5, FIG. 6, FIG. 7 and FIG. 8, a gap for movement of a movable ring 8 is formed between two fixed rings 7, a method of spacing with small movable gaskets (i.e., regulation blocks 9) is usually adopted, a plurality of fixed rings 7 are assembled together through fixing bolts (i.e., connecting rods 10), and meanwhile, one movable ring 8 and multiple regulation blocks 9 are arranged between two adjacent fixed rings 7 (from FIG. 7 and FIG. 8, it can be seen that an external diameter of the movable ring 8 is smaller than an external diameter of the fixed rings 7 and an external diameter difference between the two is an external diameter of one regulation block 9; and each regulation block 9 is a small circular ring, and each regulation block 9 is fixedly mounted between the two adjacent fixed rings 7 on the connecting rods 10 through a small hole in the middle of the small circular ring); and there are many such small movable gaskets (i.e., regulation blocks 9) (in FIG. 7 and FIG. 8, 6 small gaskets require to be assembled on the same circumference for each group of movable ring 8 and fixed rings 7, namely between every two adjacent fixed rings 7), mounting labor intensity is relatively high, and moreover, a rate of reworking caused by a mistaken assembling or neglected assembling phenomenon in a production mounting and after-sales maintenance process is very high, so that labor production efficiency is greatly reduced, and disadvantages are brought to batch production and on-site maintenance work of the equipment.

SUMMARY OF THE INVENTION

The present invention is directed to multi plate screw press sludge dewatering machine capable of solving the foregoing problems to overcome the shortcomings of the conventional art.

The technical problems to be solved by the multi plate screw press sludge dewatering machine of the present invention are to:

1: broaden an application range of the multi plate screw press dewatering machine, increase original solid content of 20,000 mg/L of treatable raw water (i.e., water content of 98% of sludge) to solid content of 5,000 mg/L of the treatable raw water (i.e., water content of 99.5% of the sludge) and improve a treatment capability;
2: solve the problems of shaft jamming and shaft sticking;
3: solve the problems of high breaking rate and inadequate strength of a plastic lamination usually adopted for a concentration section;
4: solve the problems about reliability and stability of power, convenience for maintenance and the like of the multi plate screw press sludge dewatering machine;
5: solve the problems of poor abrasion resistance and corrosion resistance, short service life and narrow application range of a lamination material; and
6: solve the problems of high mounting labor intensity, high mistaken assembling rate during assembling, low labor production efficiency and the like of the lamination.

The objective of the present invention is achieved by the following technical solutions.

Multi plate screw press sludge dewatering machine of the present invention includes a multi plate screw press sludge dewatering part, wherein the multi plate screw press sludge dewatering part includes a filtering body consisting of fixed rings, movable rings and a helical shaft, and further includes a housing, a filtrate collection tank, a filtrate outlet, a sludge inlet tank and a sludge discharging tank; the plurality of fixed rings are sequentially arranged in the housing, one movable ring concentric with the fixed rings and capable of moving are arranged between every two adjacent fixed rings, and the helical shaft penetrates through center holes of the fixed rings and the movable rings; the filtrate collection tank and the filtrate outlet are arranged at the bottom of the filtering body; the sludge inlet tank and the sludge discharging tank are arranged at two ends of the helical shaft respectively; the helical shaft is connected with a power driving device mounted on one side of the sludge discharging tank; an external diameter of the fixed rings is larger than an external diameter of the movable rings; an external diameter of the movable rings is larger than an internal diameter of the fixed rings; an internal diameter of the movable rings is smaller than the internal diameter of the fixed rings; the internal diameter of the fixed rings is larger than an external diameter of a blade of the helical shaft; the internal diameter of the movable rings is slightly smaller than the external diameter of the blade of the helical shaft (an inner end of each movable ring presses against and contacts with the outer end of the blade of the helical shaft); each fixed ring consists of an annular main body and a plurality of fixing lugs extending from the annular main body along a circumferential direction, and a small fixing hole is formed in each fixing lug; each fixed ring is fixedly connected with multiple connecting rods through multiple fixing lugs on the same circumference; two ends of each connecting rod are fixedly mounted on the sludge inlet tank and the sludge discharging tank respectively; the helical shaft adopts a variable diameter variable pitch helical shaft, a lead angle arrangement sequence of the helical blade of the whole helical shaft is gradual reduction from the sludge discharging tank to the sludge inlet tank, and the lead angle arrangement sequence is gradually reduced from 16°-22° to 6°-14°; a pitch of the helical shaft is gradually increased along a direction from the sludge inlet tank to the sludge discharging tank; and a diameter of a shaft body of the helical shaft is gradually increased in a direction from the sludge inlet tank to the sludge discharging tank from a ⅓ position of a shaft length.

Further, blockage prevention plates forming included angles of 20°-45° with a centerline of the shaft body are arranged on two sides of the bottom of the helical blade, and heights of the blockage prevention plates are not smaller than ⅔ of a height of the helical blade.

Further, an ultra abrasion-resistant hard alloy layer is overlaid on an outer edge of the helical blade of the helical shaft; a thickness of the ultra abrasion-resistant hard alloy layer is 2 mm-3 mm; and roughness of contact surfaces of the helical blade of the helical shaft and the movable rings reaches 0.8 μm-1.6 μm.

Further, the power driving device is a hydraulic driving device or a variable frequency motor.

Further, multiple regulation blocks are arranged at edges of outer ends larger than the external diameters of the movable rings on the same circumference between two adjacent fixed rings; multiple fixing lugs and multiple corresponding regulation blocks are arranged at the edge of the outer end of each fixed ring on the same circumference; small fixing holes are formed in the fixing lugs and a center of each regulation block at the edge of the outer end of each fixed ring, and the connecting rods are inserted into these small fixing holes to serially connect and fix each fixed ring and each regulation block; and each fixed ring is fixedly connected with the multiple connecting rods through the multiple fixing lugs and multiple regulation blocks on the same circumference.

Further, a circular lug boss protruding outwards perpendicularly to the circumferential direction is further arranged at each fixing lug of each fixed ring, a small fixing hole corresponding to the small fixing hole in each fixing lug is also formed in each circular lug boss, and thus each fixed ring may be fixed on the multiple connecting rods through the small fixing holes in the fixing lugs and the small fixing holes in the circular lug bosses; and each fixed ring is fixedly connected with the multiple connecting rods through the multiple fixing lugs and multiple circular lug bosses on the same circumference. According to the solution, the regulation blocks are equivalently integrated with the fixed rings, that is: a compression molding or injection molding process is adopted, and the regulation blocks (small gaskets) are integrated with the fixed rings by virtue of a mold, so that assembling operations and a mistaken assembling phenomenon may be greatly reduced, component assembling and manufacturing efficiency may be greatly improved, and overall production efficiency is improved.

Further, a triangular lug boss protruding outwards perpendicularly to the circumferential direction is further arranged at each fixing lug of each fixed ring, a small fixing hole corresponding to the small fixing hole in each fixing lug is also formed in each triangular lug boss, and thus each fixed ring may be fixed on the multiple connecting rods through the small fixing holes in the fixing lugs and the small fixing holes in the triangular lug bosses; and each fixed ring is fixedly connected with the multiple connecting rods through the multiple fixing lugs and the multiple triangular lug bosses on the same circumference. Therefore, the assembling operations and the mistaken assembling phenomenon may be greatly reduced, and moreover, such a triangular lug boss has the advantages of stable structure and large support area, may effectively control deformation of two fixed rings, also has a reinforcing function for the fixed rings and enhance bending performance of the fixed rings.

Further, a gap between every two adjacent fixed rings is set to be 2.0 mm-4.0 mm, and a gap between every two adjacent fixed ring and movable ring is set to be 0.1 mm-1 mm.

Further, the fixed rings and the movable rings are made from a carbon fiber reinforced plastics (CFRP) composite material; and a mass proportion of various components in the CFPR composite material is as follows:

| Component | Proportion/parts by mass |
|---|---|
| Polyoxymethylene (POM) resin (homopolymerized) | 60-100 |
| Carbon fiber | 20-30 |
| Polytetrafluoroethylene (PTFE) | 5-20 |
| Oily water repellent | 0.2-0.5 |
| Coupling agent | 0.3-0.4 |
| Color masterbatch | 0-0.4 | wherein the POM resin is a homopolymer of POM; the carbon fiber is a polyacrylonitrile (PAN)-based carbon fiber or an asphalt-based carbon fiber; the coupling agent includes four major categories, i.e., an organic chromium complex, silanes, titanates and an aluminate compound; and the oily water repellent is a commercially available novel advanced oily waterproof material prepared by mixing high-quality materials such as silicone oil and a silicon resin.

Further, the CFRP composite material is prepared from the foregoing components taken as raw materials by proportioning, mixing and twin-screw extrusion and granulation; and the fixed rings and the movable rings of the multi plate screw press sludge dewatering machine are obtained by performing injection molding or compression molding on the CFRP composite material.

Further, operating conditions for the injection molding process are as follows: a material drying temperature is 85-90° C., material drying time is 4-5 hours, an injection molding temperature is 170-200° C., injection molding pressure is 90-100 pa, and a mold temperature is 85-90° C.

Further, the multi plate screw press sludge dewatering machine further includes a rapid filtering part connected with the multi plate screw press sludge dewatering part; the rapid filtering part includes a shell, a filter screen and a water distribution weir; a water inlet is formed in the upper part of the shell, and the water distribution weir is arranged at the water inlet; the inclined filter screen is arranged below the water distribution weir in the shell; a liquid outlet is formed below the filter screen at the bottom of the shell; a sludge storage tank is arranged at a tail end (bottom) of the filter screen, and a sludge outlet is formed in the bottom of the sludge storage tank; the sludge outlet of the rapid filtering part is connected with the sludge inlet tank of the multi plate screw press sludge dewatering part; and the filter screen is a cambered filter screen surface or planar filter screen surface manufactured by adopting a stainless steel wedge-shaped wire welded slot screen plate.

Furthermore, the rapid filtering part further includes a cleaning system; the cleaning system is arranged below the filter screen in the shell; and the cleaning system includes flushing sprinklers, a flushing water pipe and a fixing frame, the flushing water pipe is fixedly mounted on the fixing frame, and the plurality of flushing sprinklers are mounted on the flushing water pipe.

Furthermore, the multi plate screw press sludge dewatering machine further includes a flocculation mixing part connected with the rapid filtering part; the flocculation mixing part includes a mixing tank body and mixing equipment, a sludge inlet is formed in the middle part of one side of the tank body, an overflow opening is further formed at the sludge inlet, a chemical addition opening is formed in the upper part of the tank body, a sludge outlet is formed in the upper part of the other side of the tank body, and an emptying opening is formed in the bottom of the tank body; the sludge outlet of a mixing tank is connected with the water inlet of the shell of the rapid filtering part; and the flocculation mixing part may adopt various stirring and mixing forms, for example, mechanical stirring and mixing and pipeline mixer forms (that is, the mixing equipment is an electric stirring paddle, a pipeline mixer or the like).

The present invention has the following beneficial effects.

Compared with the conventional art, the multi plate screw press sludge dewatering machine of the present invention has the following advantages.

1: The flocculation mixing part and the rapid filtering part are additionally arranged in front of the multi plate screw press sludge dewatering part, and part of water is rapidly filtered through the filter screen to control water content of sludge entering the multi plate screw press sludge dewatering machine to be equal to or lower than 98%, so that a treatment range of the multi plate screw press sludge dewatering machine is broadened, and original solid content of 20,000 mg/L of treatable raw water (i.e., water content of 98% of the sludge) is increased to solid content of 5,000 mg/L of the treatable raw water (i.e., water content of 99.5% of the sludge). Therefore, on one hand, working efficiency of the dewatering equipment may be improved; and on the other hand, a secondary sedimentation tank and a concentration tank in a conventional sewage treatment process may be eliminated, and an occupied area may be greatly reduced.

2: The multi plate screw press sludge dewatering part adopts the novel special multi plate screw press sludge dewatering machine and the novel helical shaft thereof, and the helical shaft is specially designed, so that the pitch is more reasonable, a helical angle is gentler, frictional resistance when the sludge passes through the helical shaft may be effectively reduced, and phenomena of shaft blockage and shaft sticking of the sludge may be reduced.

3: The novel CFRP composite material is adopted to manufacture a lamination (movable rings and fixed rings) of the multi plate screw press sludge dewatering part, and the material is a fiber reinforced material prepared from a thermosetting resin taken as a matrix and the carbon fiber and fabric thereof taken as a dispersoid by virtue of the compression molding or injection molding process. The material has the characteristics of high strength, high modulus, low density, less friction, high abrasion resistance, self-lubrication, corrosion resistance, fatigue resistance, creep resistance, low thermal expansion coefficient and high water resistance, and is suitable for manufacturing the movable rings and the fixed rings of the multi plate screw press sludge dewatering machine, and the service life of the movable rings and the fixed rings may be prolonged to 5 to 8 years. The multi plate screw press sludge dewatering machine of the present invention adopts the CFRP composite material lamination, and its strength, rigidity, abrasion resistance, corrosion resistance and labor production efficiency are more than twice of those of conventional dewatering equipment adopting a plastic lamination.

4: Novel dewatering equipment driving power is adopted; the weight and the size are greatly reduced; and the driving power may be self-regulated according to a load, so that the problems about the reliability and stability of the power, convenience for maintenance and the like of the multi plate screw press sludge dewatering machine are solved.

5: The compression molding or injection molding process is adopted, and the small gaskets are integrated with the fixed rings by virtue of the mold, so that the assembling operations and the mistaken assembling phenomenon are greatly reduced, and the assembling operations may be reduced by 80% or more. Therefore, component assembling and manufacturing efficiency is greatly improved, and overall production efficiency is improved.

6: Designing the lug boss at each fixing lug of each fixed ring into a triangular structure (i.e., triangular lug boss) may achieve more advantages: the structure is stable, the support area is large, the deformation of two fixed rings may be effectively controlled, meanwhile, the reinforcing function for the fixed rings is realized, and the bending performance of the fixed rings is enhanced.

Figure 1:
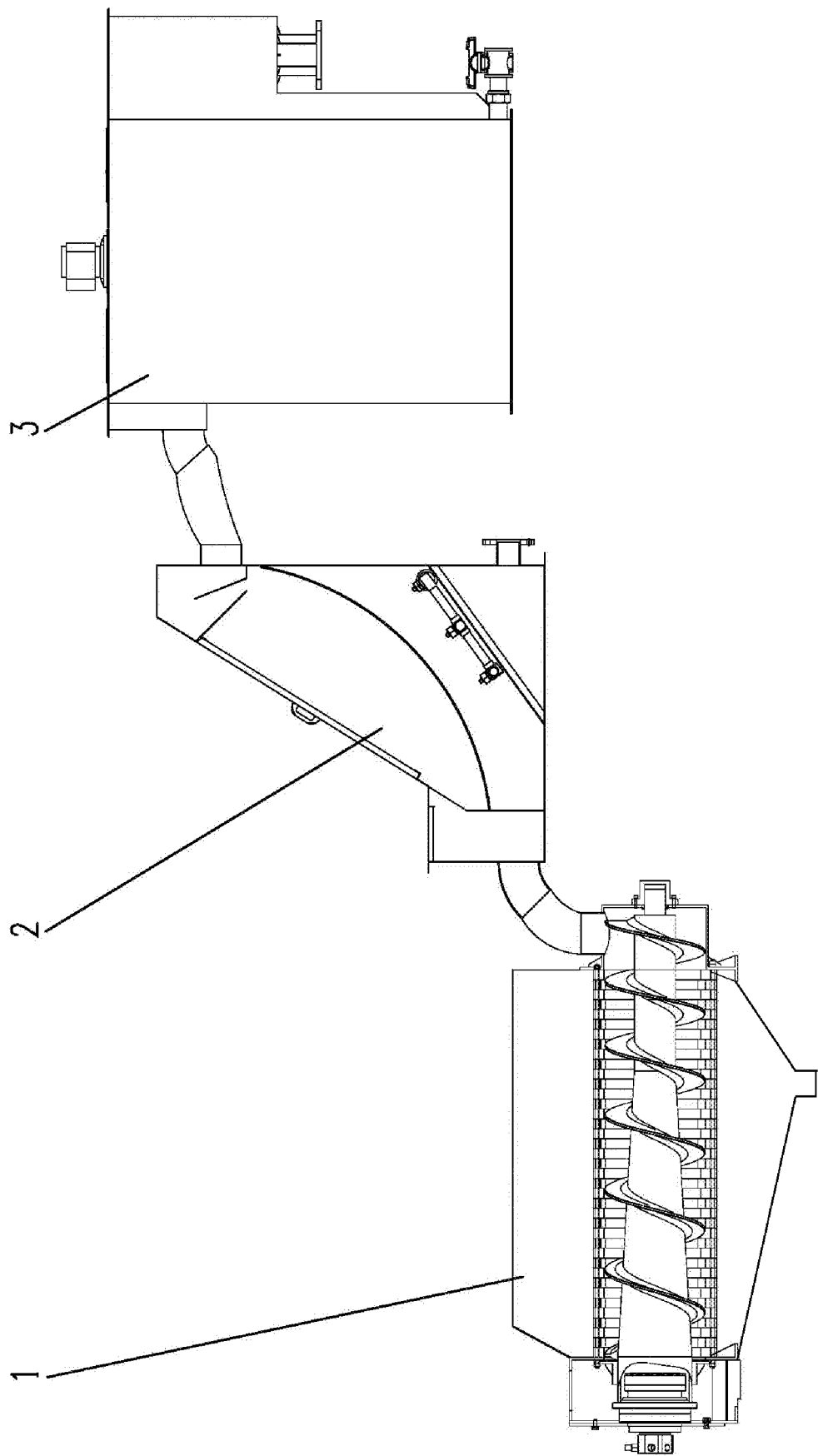
FIG. 1 is an overall structure diagram of multi plate screw press sludge dewatering machine according to the present invention.

In the drawings: 1: multi plate screw press sludge dewatering part; 2: rapid filtering part; 3: flocculation mixing part; 4: power driving device; 5: sludge discharging tank; 6: helical shaft; 3A: dewatering section; 3B: concentration section; 7: fixed ring; 71: fixing lug; 72: circular lug boss: 73: small fixing hole; 75: triangular lug boss; 8: movable ring; 9: regulation block (small gasket); 10: connecting rod (fixing bolt); 11: sludge inlet tank; 12: housing; 13: filtrate collection tank; 14: filtrate outlet; 15: shaft body; 16: helical blade; 17: blockage prevention plate; 18: shell; 19: filter screen; 20: water distribution weir; 21: cleaning system; 22: flushing sprinkler; 23: flushing water pipe; 24: fixing frame; 25: water inlet; 26: liquid outlet; 27: sludge outlet; 28: mixing tank body; 29: driving motor; 30: stirring paddle; 31: sludge inlet; 32: sludge outlet; 33: overflow opening; 34: emptying opening; and 36: sludge storage tank.

DESCRIPTION OF THE EMBODIMENTS

The present invention will now be further described below in combination with the accompanying drawings and embodiments.

Embodiment 1

As shown in FIG. 1, multi plate screw press sludge dewatering machine of the present invention in the present embodiment includes a flocculation mixing part 3, a rapid filtering part 2 and a multi plate screw press sludge dewatering part 1 which are sequentially connected, and is an integrated machine combining the foregoing three parts.

Figure 2:
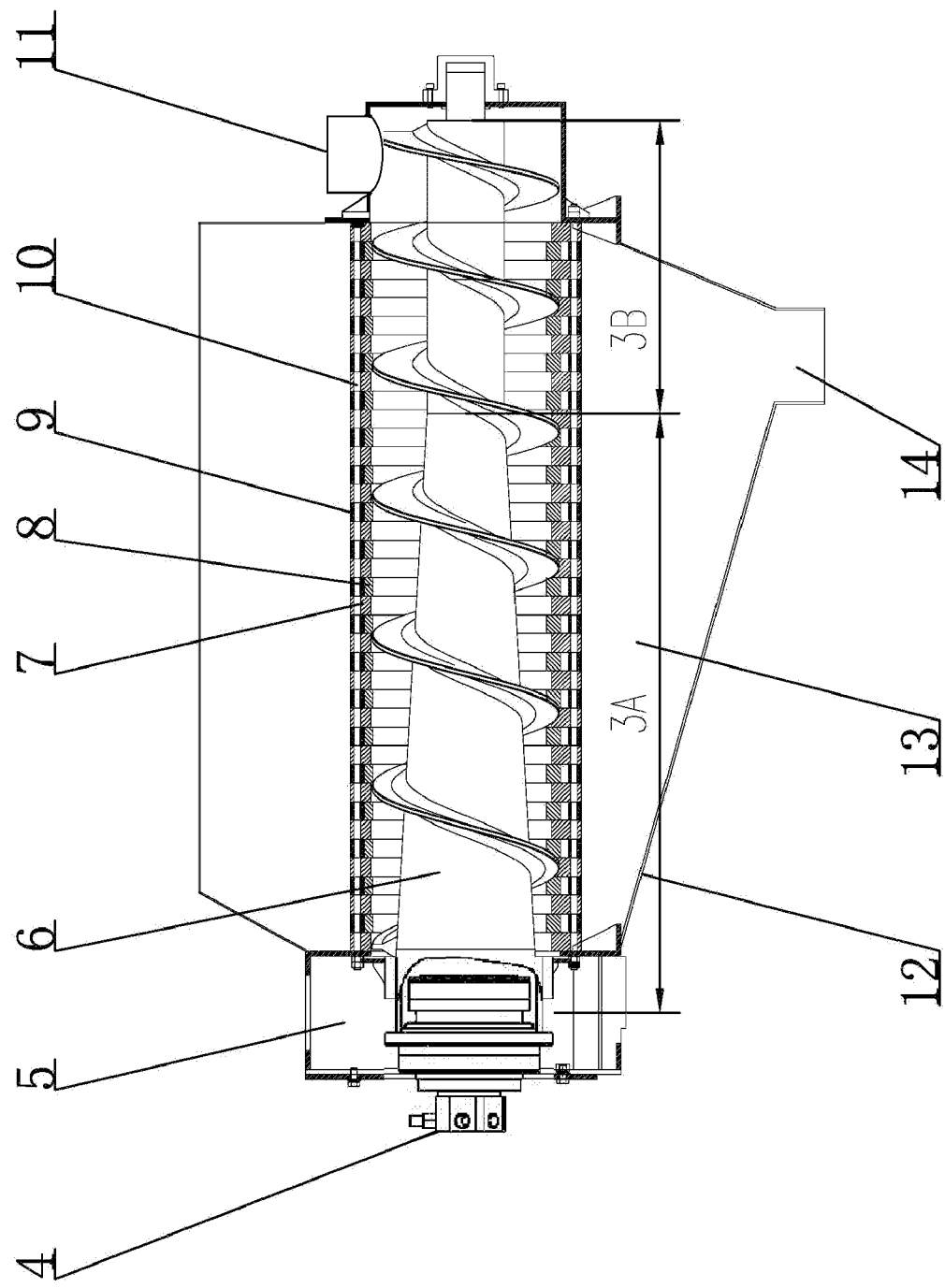
FIG. 2 is a structure diagram of a multi plate screw press sludge dewatering part 1 in the present invention.

As shown in FIG. 2, the multi plate screw press sludge dewatering part 2 includes components such as a power driving device 4, a sludge discharging tank 5, a helical shaft 6, fixed rings 7, movable rings 8, regulation blocks 9, connecting rods 10, a sludge inlet tank 11, a housing 12, a filtrate collection tank 13 and a filtrate outlet opening 14; the plurality of fixed rings 7 are sequentially arranged in the housing 12, one movable ring 8 is arranged between every two adjacent fixed rings 7, and one regulation block 9 is arranged between every two adjacent fixed rings 7 to regulate a gap between the two fixed rings, so as to enable the movable ring 8 to freely move between the two fixed rings 7. The helical shaft 6 penetrates through interiors of the fixed rings 7 and the movable rings 8, and the sludge inlet tank 11 and the sludge discharging tank 5 are arranged at two ends of the helical shaft 6 respectively. A plural of fixed rings 7 and movable rings 8 are provided, and may be added and reduced according to a requirement. The sludge discharging tank 5, the fixed rings 7, the regulation blocks 9 and the sludge inlet tank 11 are fixedly connected through multiple connecting rods 10 on the same circumference.

Figure 3:
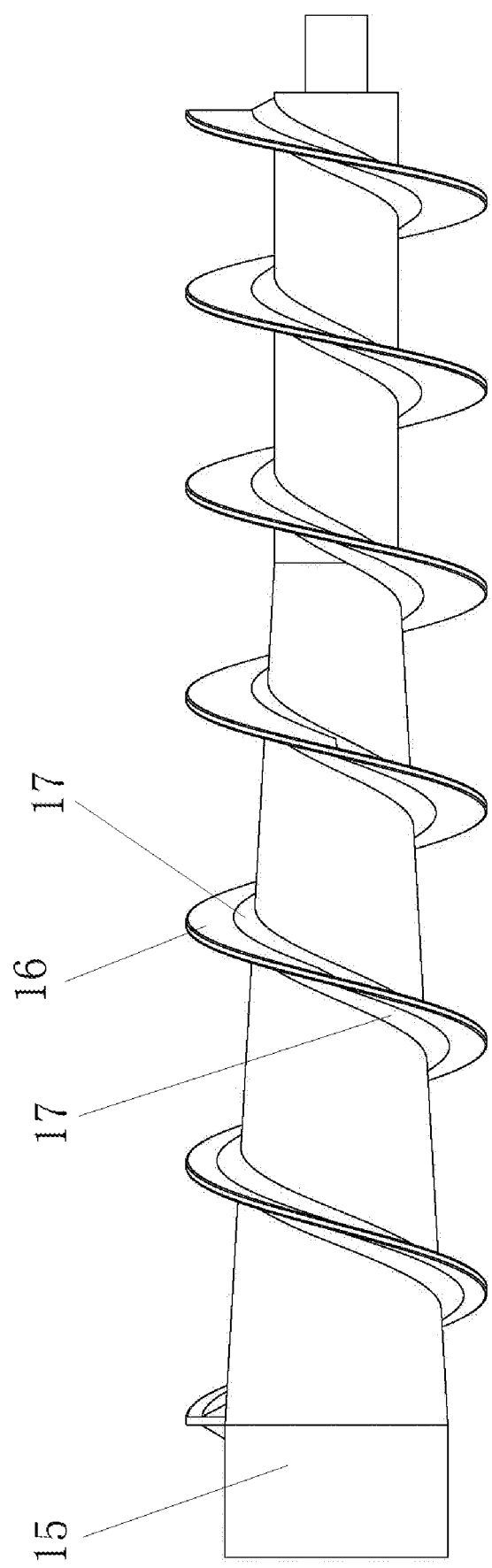
FIG. 3 is a structure diagram of a helical shaft 6 in the present invention.

As shown in FIG. 3, the helical shaft 6 is a novel helical shaft of the multi plate screw press sludge dewatering machine, and is formed by welding three major parts, i.e., a shaft body 15, a helical blade 16 and block prevention plates 17, and its detailed solution is as follows: a lead angle arrangement sequence of the helical blade of the helical shaft is gradual reduction from the sludge discharging tank 5 to the sludge inlet tank 11, and the lead angle arrangement sequence is gradually reduced from 16°-22° to 6°-14° (the lead angle is also called a thread lift angle, and refers to an included angle between a circumferential line formed by expanding a pitch diameter of a thread and a helical line); a pitch of the helical shaft 6 (i.e., an axial distance between every two adjacent circles of the helical blade 6) is gradually increased in a direction from the sludge inlet tank 11 to the sludge discharging tank 5, and the pitch is more reasonable; and a diameter of the shaft body 15 of the helical shaft is gradually increased in the direction from the sludge inlet tank 11 to the sludge discharging tank 5 from a ⅓ position of a shaft length. In a dewatering process of the multi plate screw press sludge dewatering machine, water content of sludge at an end of the sludge inlet tank 11 is relatively high, and a friction coefficient and a filling coefficient of the sludge are relatively low, so that a concentration section 3B of the helical shaft requires a relatively high driving capability (a relatively small helical lead angle is required) to generate relatively high pressure on the sludge at a rear end, so as to promote a dewatering effect, prolong the whole dewatering section and dewatering time, balance the pressure of the dewatering section of the multi plate screw press dewatering machine better and make the water content of the discharged sludge lower; and water content of the sludge at the end of the sludge discharging tank 5 is relatively low and a friction coefficient and a filling coefficient of the sludge are relatively high, so that a dewatering section 3A of the helical shaft does not require a high driving capability (the relatively small helical lead angle is not required), the friction coefficient and the filling coefficient of the sludge are sharply increased along with rapid reduction in the water content of the sludge, leading to multiply a frictional force between the sludge at the dewatering section 3A and the helical blade 16, and at this moment, if the helical lead angle is too small, local pressure may be extremely high, and the movable rings and the helical shaft may be abraded. In combination with a helical delivery principle (the driving capability is higher if the helical lead angle is smaller), such a design that, from the sludge inlet tank 11 to the sludge discharging tank 5, the lead angle is gradually enlarged, the pitch is gradually increased and the diameter is gradually increased is adopted for the helical shaft of the present invention, so that sludge dewatering efficiency may be effectively improved, meanwhile, the extent of damage to the movable rings 8 (movable laminations) and the fixed rings 7 (fixed laminations) may be reduced, and the service life of the movable rings and the fixed rings is prolonged.

As shown in FIG. 3, the blockage prevention plates 17 forming included angles of 20°-45° with a centerline of the shaft body are arranged on two sides of the bottom of the helical blade 16 of the helical shaft, and heights of the blockage prevention plates 17 are not smaller than ⅔ of a height of the helical blade 16. The blockage prevention plates 17 are additionally arranged to achieve the effect that: in a material movement process, frictional resistance of a right angle of the helical blade 16 (an included angle between the helical blade and the centerline of the shaft body is a 90° right angle) to a material is reduced to prevent stopping and shaft sticking of the material. Moreover, multiple ultra abrasion-resistant hard alloy layers (ultra abrasion-resistant hard alloy layers containing rare metals cobalt, tungsten and chromium) are overlaid at the top end of the helical blade 16, and a thickness is 2-3 mm; the whole helical shaft is finely machined and manufactured by more than 40 procedures, and a surface of the helical shaft is more rounded and smoother; and a precision grinding and polishing fine machining manner is adopted, so that roughness of contact surfaces of the helical blade of the helical shaft and the movable rings reaches 0.8-1.6 μm. Compared with that of existing ordinary multi plate screw press sludge dewatering machine, the service life of the helical shaft may be prolonged by more than 3 or 4 times.

Figure 4:
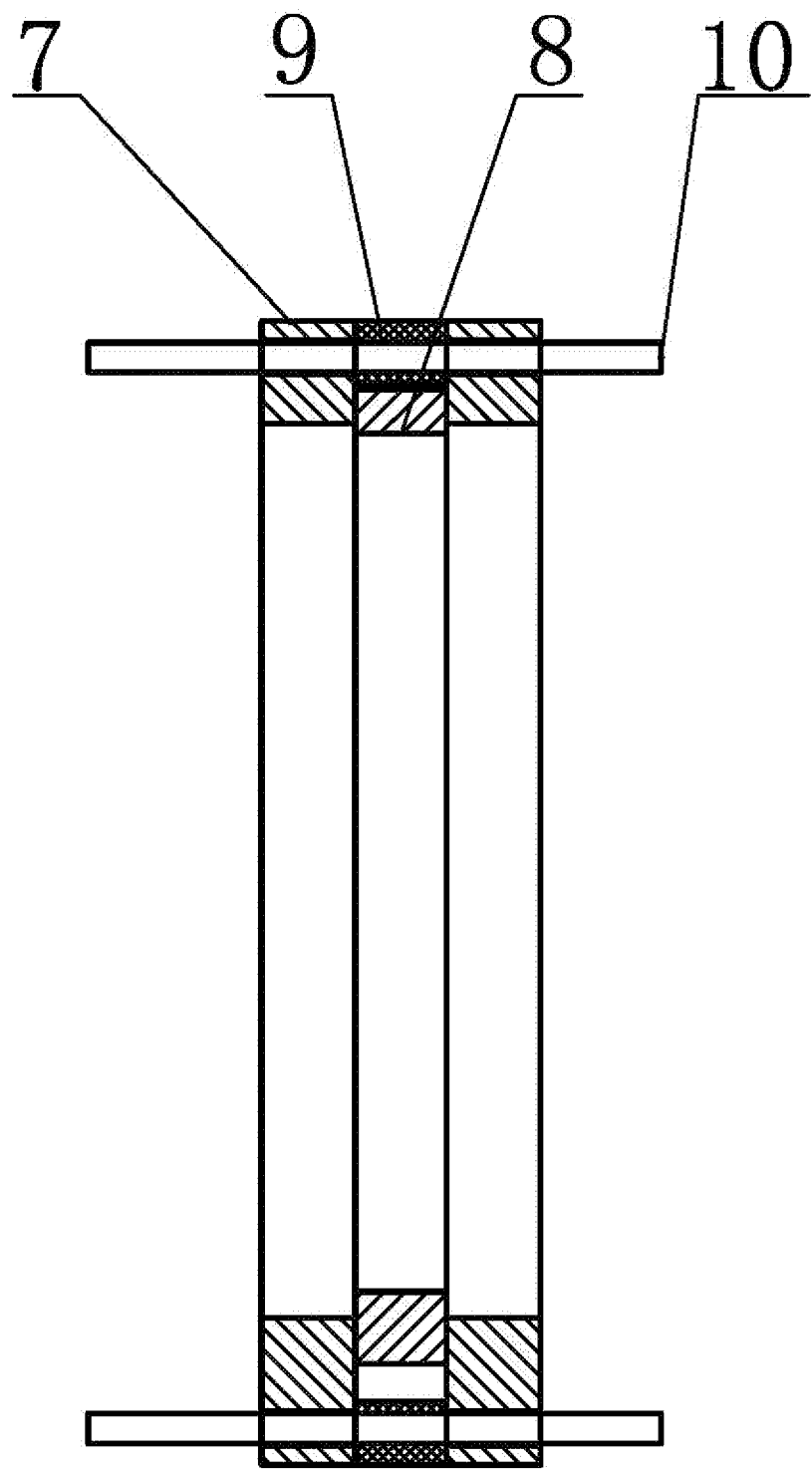
FIG. 4 is a connection schematic diagram of fixed rings 7, movable rings 8 and regulation blocks 9 in the present invention.

As shown in FIG. 4, the regulation blocks 9 are arranged between every two adjacent fixed rings 7 to regulate a gap between the two fixed rings, so as to enable the movable ring 8 to freely radially move between the two fixed rings 7; the gap between every two adjacent fixed rings is set to be 2.0 mm-4.0 mm, and a gap between one fixed ring 7 and one movable ring 8 is set to be 0.1 mm-1 mm; an external diameter of the fixed rings 7 is larger than an external diameter of the movable rings 8; the external diameter of the movable rings 8 is larger than an internal diameter of the fixed rings 7; an internal diameter of the movable rings 8 is smaller than the internal diameter of the fixed rings 7; the internal diameter of the fixed rings 7 is larger than an external diameter of the blade of the helical shaft; the internal diameter of the movable rings 8 is slightly smaller than the external diameter of the blade of the helical shaft (an inner end of each movable ring presses against and contacts with an outer end of the blade of the helical shaft); and when the helical shaft rotates, the blade of the helical shaft may drive the movable ring 8 to radially move between the two fixed rings 7 (the movable ring 8 is eccentric when radially moving), and simultaneously perform shearing movement on the sludge positioned in a channel of the blade of the helical shaft to promote dewatering of the sludge.

Figure 5:
FIG. 5 is a lateral cross-sectional structure diagram of each fixed ring 7 in the present invention.
Figure 6:
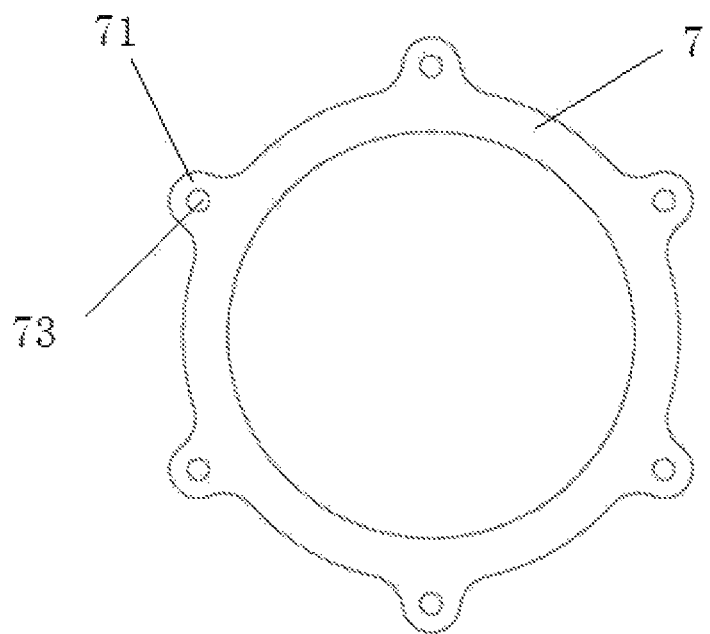
FIG. 6 is a front structure diagram of each fixed ring 7 in the present invention.

As shown in FIG. 5 and FIG. 6, each fixed ring 1 consists of an annular main body and 6 fixing lugs 71 extending from the annular main body along a circumferential direction, and a small fixing hole 73 is formed in each fixing lug 71.

Figure 7:
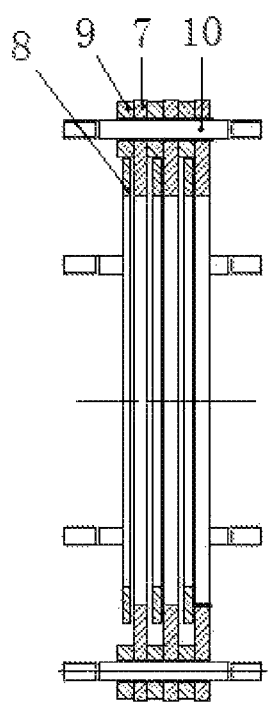
FIG. 7 is a lateral cross-sectional structure diagram when the fixed rings 7 in the present invention and the movable rings 8 are mounted together through the regulation blocks 9.
Figure 8:
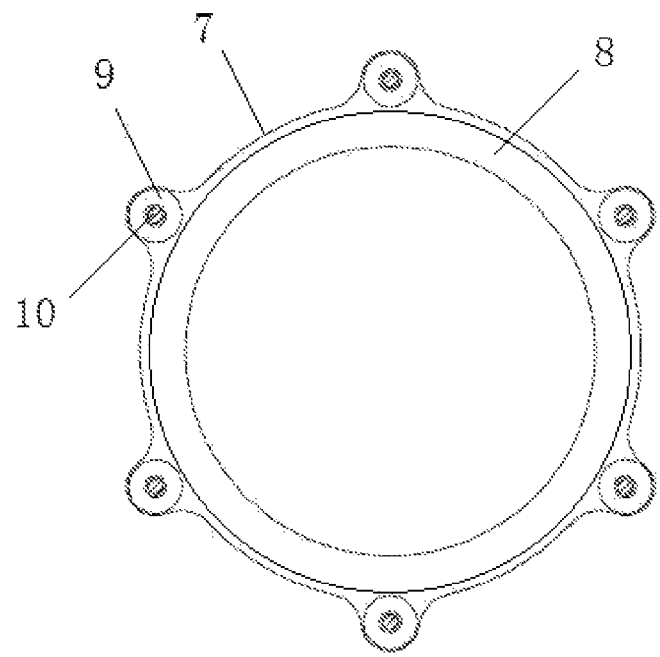
FIG. 8 is a front structure diagram when the fixed rings 7 in the present invention and the movable rings 8 are mounted together through the regulation blocks 9.
Figure 9:
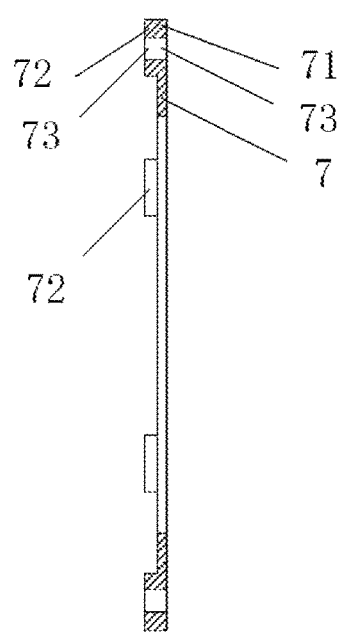
FIG. 9 is a lateral cross-sectional structure diagram of lug bosses 72, formed by integrating the regulation blocks 9 and the fixed rings 7, on the fixed rings 7 in the present invention.
Figure 10:
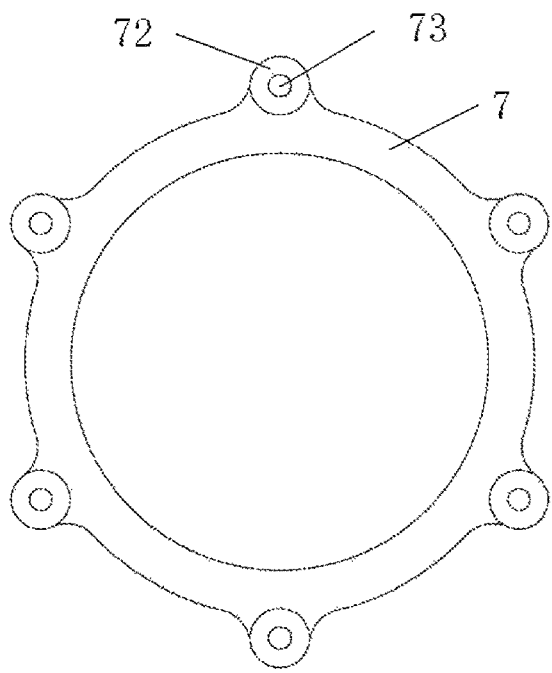
FIG. 10 is a front cross-sectional structure diagram of the lug bosses 72, formed by integrating the regulation blocks 9 and the fixed rings 7, on the fixed rings 7 in the present invention.
Figure 11:
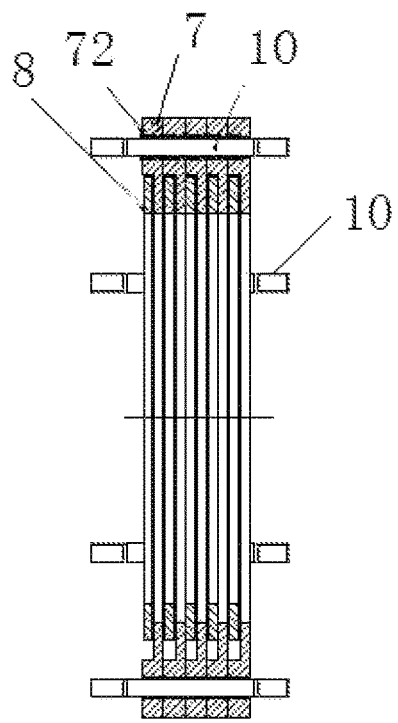
FIG. 11 is a lateral cross-sectional structure diagram when the fixed rings 7 with the lug bosses 71 and the movable rings 8 are mounted together in the present invention.
Figure 12:
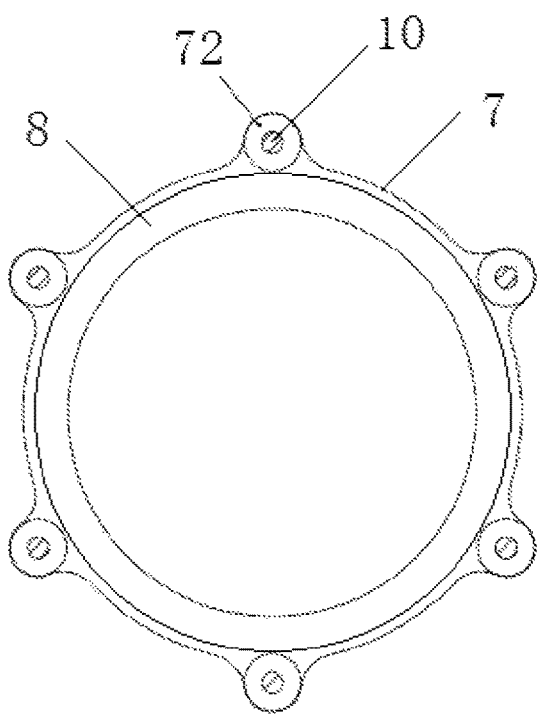
FIG. 12 is a front structure diagram when the fixed rings 7 with the lug bosses 72 and the movable rings 8 are mounted together in the present invention.
Figure 13:
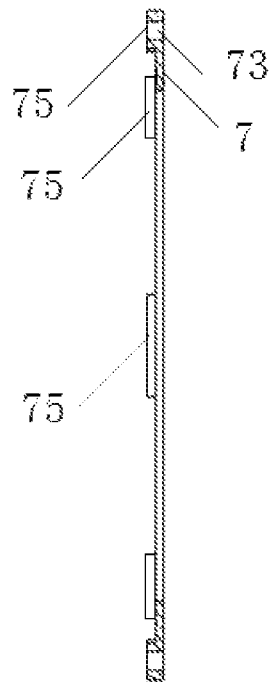
FIG. 13 is a lateral cross-sectional structure diagram when triangular lug bosses 75 are arranged on the fixed rings 7 in the present invention.
Figure 14:
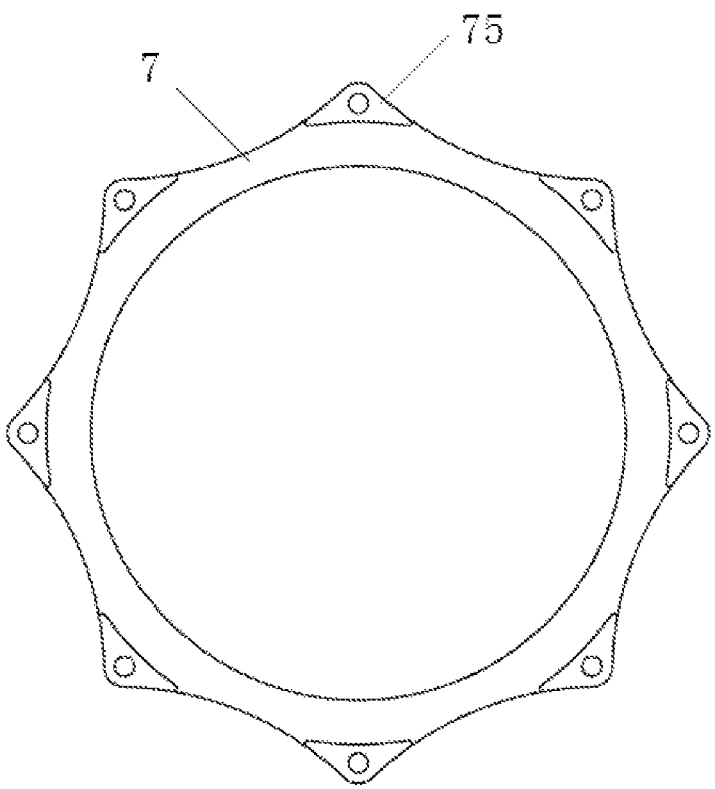
FIG. 14 is a front structure diagram when the triangular lug bosses 75 are arranged on the fixed rings 7 in the present invention.
Figure 15:
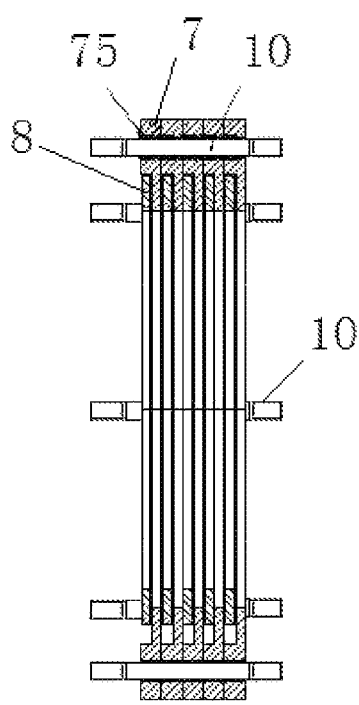
FIG. 15 is a lateral cross-sectional structure diagram when the fixed rings 7 with the triangular lug bosses 75 and the movable rings 8 are mounted together in the present invention.
Figure 16:
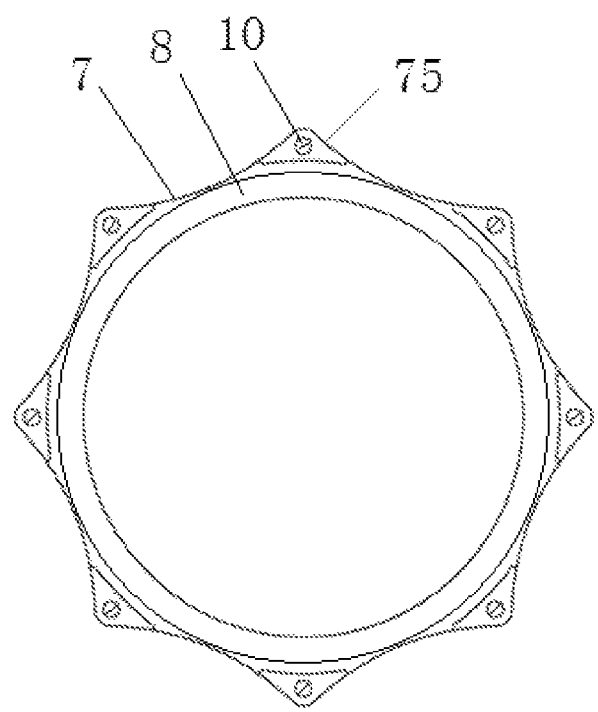
FIG. 16 is a front structure diagram when the fixed rings 7 with the triangular lug bosses 75 and the movable rings 8 are mounted together in the present invention.

As shown in FIG. 7 and FIG. 8, six fixing lugs 71 and six small fixing holes 73 are arranged at an edge of an outer end of each fixed ring on the same circumference; one regulation block 9 is correspondingly arranged at each fixing lug 71; each regulation block 9 is a small circular ring, and a small fixing hole 73 is also formed in the middle part of each small circular ring; and the connecting rods 10 are inserted into these small fixing holes 73 in the fixed rings 7 and the regulation blocks 9 to serially connect and fix each fixed ring 7 and each regulation block 9. Each fixed ring 7 is fixedly connected with six connecting rods 10 through the six fixing lugs 71 and the six corresponding regulation blocks 9 on the same circumference; and two ends of each connecting rod 10 are fixedly mounted on the sludge inlet tank 11 and the sludge discharging tank 5 respectively.

A lamination of a multi plate screw press sludge dewatering machine of the present embodiment includes fixed rings 7 and movable rings 8 which are all made from a CFRP composite material.

A mass proportion of various components in the CFPR composite material is as follows:

| Component | Proportion/parts by mass |
| --- | --- |
| POM resin (homopolymerized) | 100 |
| Carbon fiber | 30 |
| PTFE | 15 |
| Oily water repellent | 0.5 |
| Coupling agent | 0.4 |
| Color masterbatch | 0.3 |

The CFRP composite material is prepared from the foregoing components taken as raw materials by proportioning, mixing and twin-screw extrusion and granulation; and the lamination (the fixed rings 7 and the movable rings 8) of the multi plate screw press sludge dewatering machine is obtained by performing injection molding on the CFRP composite material.

Operating conditions for the injection molding process are as follows: a material drying temperature is 85° C., material drying time is 5 hours, an injection molding temperature is 200° C., injection molding pressure is 100 pa, and a mold temperature is 90° C.

In the present embodiment, a low-speed high-torque hydraulic motor is adopted as driving power for the helical shaft of the multi plate screw press sludge dewatering part 1 (that is, the power driving device 4 is the low-speed high-torque hydraulic motor), which is different from the conventional multi plate screw press dewatering machine. The low-speed high-torque hydraulic motor has the following advantages: it is high in starting torque (mechanical efficiency during starting is higher than or equal to 0.9), low in failure rate and good in low-speed stability, and may operate in balance at a very low speed; a relatively high power-mass ratio and a relatively small size and weight are achieved, so that it has the characteristic of low noise and the advantages of high mechanical and volumetric efficiency, rotating direction reversibility, bearability of an output shaft for radial and axial external forces, small rotational inertia and the like, and is more suitable for a service condition of the multi plate screw press dewatering machine; and compared with another type of speed reducer with the same output torque, it has a weight which is only a half of the original weight and a size reduced by ⅔, so that it may be maintained on the spot more simply and easily.

Figure 17:
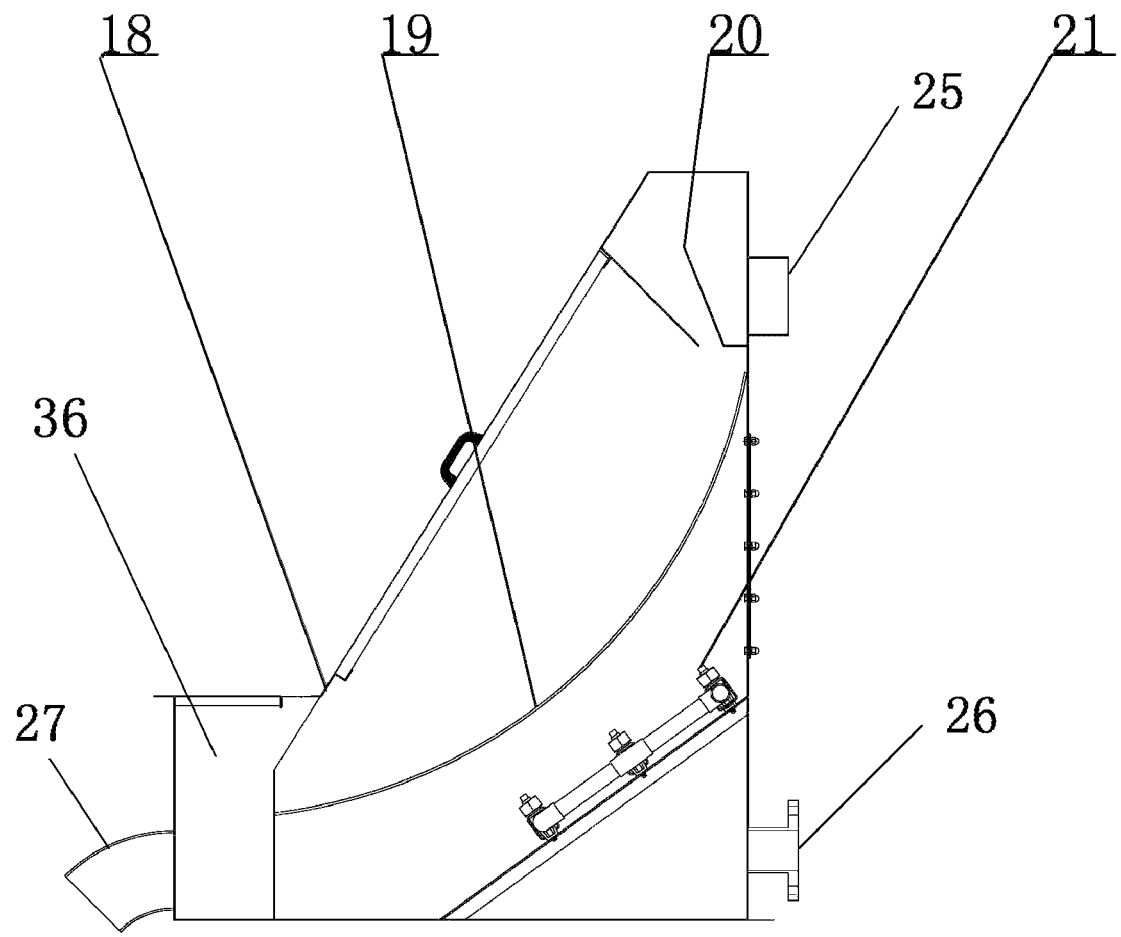
FIG. 17 is a structure diagram of a rapid filtering part 2 in the present invention.
Figure 18:
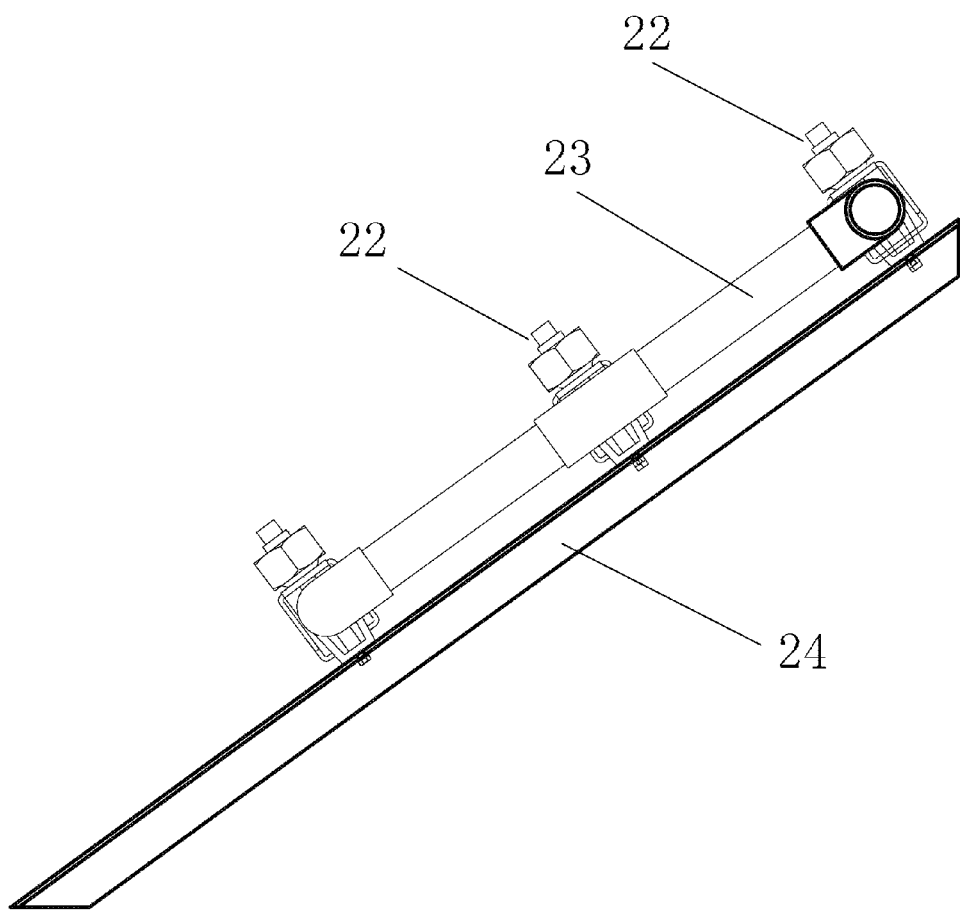
FIG. 18 is a structure diagram of a cleaning system 21 of the rapid filtering part 2 in the present invention.

As shown in FIG. 17, the rapid filtering part 2 mainly includes a shell 18, a filter screen 19, a water distribution weir 20 and a cleaning system 21; the shell 18 has a narrow upper part and a wide lower part, and the filter screen is obliquely mounted in the shell 18; a water inlet 25 is formed in the upper part of one side of the shell, and the water distribution weir 20 is arranged at the water inlet 25; the inclined filter screen is arranged below the water distribution weir 20; a liquid outlet 26 is formed in the bottom, close to one side of the water inlet 25, in the shell (below the filter screen and the cleaning system); a sludge storage tank 36 is arranged at a tail end (bottom) of the filter screen, and a sludge outlet 27 is formed in the bottom of the sludge storage tank 36; and the sludge outlet 27 of the rapid filtering part 2 is connected with the sludge inlet tank 11 of the multi plate screw press sludge dewatering part 1. The rapid filtering part 2 acts to intercept sludge flocs and rapidly filter part of water to control water content of sludge entering the multi plate screw press sludge dewatering machine to 95%-98%, so as to realize functions of greatly reducing the size and concentrating. The filter screen 19 is a cambered filter screen surface or planar filter screen surface manufactured by adopting a wedge-shaped slot welded stainless steel screen plate (also called a stainless steel wedge-shaped wire welded slot screen plate). Sewage to be treated enters from the water inlet 25, and is uniformly distributed onto the inclined filter screen 19 through the water distribution weir 20, the solid-state flocs in the sewage are intercepted, filtered water flows out from gaps of the screen plate, and the solid-state flocs are driven to the lower end of the screen plate under the action of hydraulic power, and are discharged into a dewatering body of the multi plate screw press sludge dewatering part 1 from the sludge outlet 27, so that a purpose of rapid separation and concentration is achieved, and a treatment load for subsequent dewatering is reduced. The filter screen 19 may select a magnitude of a treatment capacity according to a size of a filtering area and sizes of gaps of wedge-shaped slots (the gaps are usually 0.3-1 mm) to achieve a purpose of rapid filtering treatment. The rapid filtering part 2 works by virtue of gravity of a water flow and generates no energy consumption. The rapid filtering part 2 is further provided with the cleaning system 21, and the cleaning system 21 is arranged below the filter screen 10 in the shell. As shown in FIG. 18, the cleaning system 21 includes flushing sprinklers 22, a flushing water pipe 23 and a fixing frame 24, the flushing water pipe 23 is fixedly mounted on the fixing frame 24, and the plurality of flushing sprinklers 22 are mounted on the flushing water pipe 23. The flushing sprinklers 23 may be used for periodically flushing the wedge-shaped slots to prevent blockage.

Figure 19:
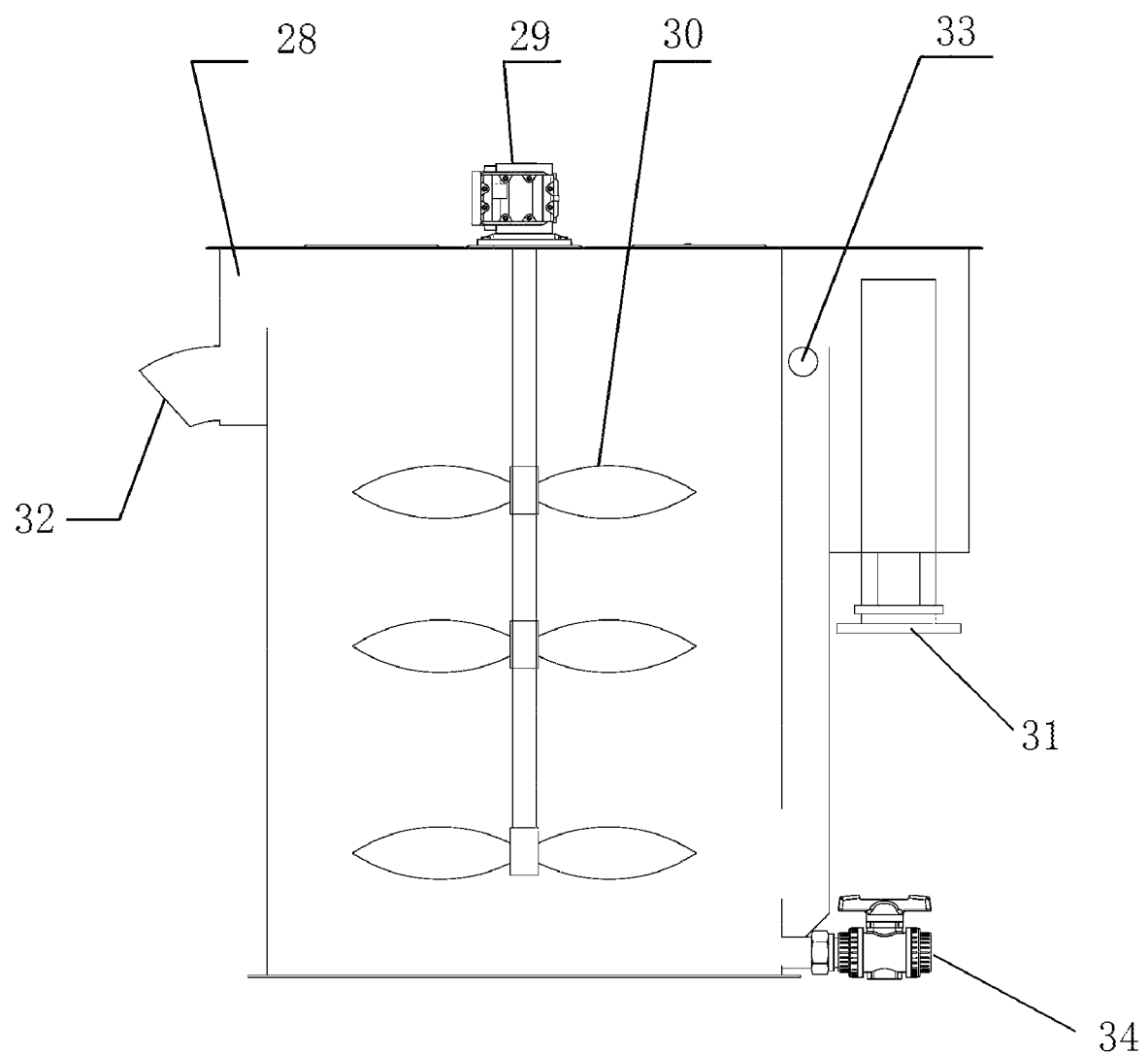
FIG. 19 is a structure diagram of a flocculation mixing part 3 in the present invention.

As shown in FIG. 19, the flocculation mixing part 3 includes a mixing tank body 28, a stirring paddle 30 and a driving motor 29 thereof, a sludge inlet 31 is formed in the middle part of one side of the tank body, an overflow opening 35 is further formed at the sludge inlet, a chemical addition opening 33 is formed in the position, close to the sludge inlet, of the upper part of the tank body, a sludge outlet 32 is formed in the upper part of the other side of the tank body, and an emptying opening 34 is formed in the bottom of the tank body; and the sludge outlet 32 of a mixing tank is connected with the water inlet 25 of the shell of the rapid filtering part. The flocculation mixing part 3 has a mixing and stirring flocculation function: after being added into raw water, a flocculating agent is fully mixed with a water body by stirring to rapidly and uniformly coagulate active ingredients of the flocculating agent with colloidal particles in the water to destabilize most of colloidal impurities in the water, and the destabilized colloidal particles mutually effectively collide and coagulate in a flocculation tank to gradually grow into large colliding particles, thereby realizing solid-liquid separation.

A process flow of the multi plate screw press sludge dewatering machine of the present embodiment is as follows: the raw water, i.e., the sewage (water content of the sludge is 99.5% or more) enters the flocculation mixing part 3 from the sludge inlet 31 of the mixing tank body 28 and, after the flocculating agent is added for flocculation mixing and stirring to coagulate the colloidal particles, enters the rapid filtering part 2, part of water is rapidly filtered through the filter screen 19 to control the water content of the sludge to 95%-98%, then the sludge enters the multi plate screw press sludge dewatering part 1, the water content of the sludge may be equal to or lower than 80% after further dewatering, and the sludge may be further utilized subsequently.

In the present embodiment, the flocculation mixing part 3 and the rapid filtering part 2 are additionally arranged in front of the multi plate screw press sludge dewatering machine, particularly the rapid filtering part 2 is additionally arranged, part of water is rapidly filtered through the filter screen 19, so as to control the water content of the sludge entering the multi plate screw press sludge dewatering machine to 95%-98%, so that a treatment range of the multi plate screw press sludge dewatering machine may be broadened, and original solid content of 20,000 mg/L of treatable raw water (i.e., water content of 98% of the sludge) may be increased to solid content of 5,000 mg/L or more of the treatable raw water (i.e., water content of 99.5% or more of the sludge). Therefore, on one hand, working efficiency of the dewatering equipment may be improved; and on the other hand, a secondary sedimentation tank and concentration tank in a conventional sewage treatment process may be eliminated, and an occupied area may be greatly reduced.

Embodiment 2

Multi plate screw press sludge dewatering machine of the present invention in the present embodiment is basically the same as that in embodiment 1, and the difference is as follows.

As shown in FIG. 9, FIG. 10, FIG. 11 and FIG. 12, each fixed ring 7 of the multi plate screw press sludge dewatering machine of the embodiment consists of an annular main body and six fixing lugs 71 extending from the annular main body along a circumferential direction, and a small fixing hole 73 is formed in each fixing lug 71; and a circular lug boss 72 protruding outwards perpendicularly to the circumferential direction is further arranged at each fixing lug 71, and a small fixing hole 73 corresponding to the small fixing hole 73 in each fixing lug is also formed in each circular lug boss 72. According to the present embodiment, an injection molding or compression molding process is adopted, regulation blocks 9 are integrated with the fixed rings 7 by virtue of a mold, and the regulation blocks 9 are turned into the circular lug bosses 72 on lateral surfaces of the fixing lugs 71 of the fixed rings 7, so that component manufacturing efficiency is greatly improved. That is: the fixed rings 7 are integrated with original small movable gaskets (regulation blocks 9), the circular lug bosses 72 are arranged at positions where the small gaskets are originally mounted (i.e., positions, where the fixing lugs 71 are arranged, on peripheral edges of the fixed rings 7), and small fixing holes 73 are also formed in the circular lug bosses 72. From FIG. 9, it can be seen that the circular lug bosses 72 protrude outwards in a way of clinging to circumferential surfaces at the fixing lugs 71 perpendicularly to the circumferential direction. From FIG. 11 and FIG. 12, it can be seen that each fixed ring 7 is fixedly connected with six connecting rods 10 through the six fixing lugs 71 and the six circular lug bosses 72 on the same circumference, and two ends of each connecting rod 10 are fixedly mounted on a sludge inlet tank 11 and a sludge discharging tank 5 respectively. A plurality of fixed rings 7 are assembled together through fixing bolts (i.e., connecting rods 10), only one movable ring 8 requires to be assembled between every two adjacent fixed rings 7, and no small movable gaskets (regulation blocks 9) require to be mounted, so that assembling operations and a mistaken assembling phenomenon are greatly reduced, and production efficiency is greatly improved.

A lamination of the multi plate screw press sludge dewatering machine of the present embodiment includes the fixed rings 7 and the movable rings 8, which are all made from a CFRP composite material; and a mass proportion of various components in the CFPR composite material is as follows:

| Component | Proportion/parts by mass |
|---|---|
| POM resin (homopolymerized) | 80 |
| Carbon fiber | 25 |
| PTFE | 10 |
| Oily water repellent | 0.4 |
| Coupling agent | 0.35 |
| Color masterbatch | 0.4 |

The CFRP composite material is prepared from the foregoing components taken as raw materials by proportioning, mixing and twin-screw extrusion and granulation; and the lamination of the multi plate screw press sludge dewatering machine is obtained by performing injection molding on the CFRP composite material.

Operating conditions for the injection molding process are as follows: a material drying temperature is 90° C., material drying time is 4 hours, an injection molding temperature is 170° C., injection molding pressure is 90 pa, and a mold temperature is 85° C.

Embodiment 3

Multi plate screw press sludge dewatering machine of the present invention in the present embodiment is basically the same as that in embodiment 1, and the difference is as follows.

As shown in FIG. 13, FIG. 14, FIG. 15 and FIG. 16, each fixed ring 7 of the multi plate screw press sludge dewatering machine of the present embodiment consists of an annular main body and eight fixing lugs 71 extending from the annular main body along a circumferential direction, and a small fixing hole 73 is formed in each fixing lug 71; the eight fixing lugs 71 are triangular; a triangular lug boss 75 protruding outwards perpendicularly to a circumferential direction is further arranged at each fixing lug 71, and a small fixing hole 73 corresponding to the small fixing hole 73 in each fixing lug is also formed in each triangular lug boss 75. According to the present embodiment, an injection molding or compression molding process is adopted, regulation blocks 9 are integrated with the fixed rings 7 by virtue of a mold, the regulation blocks 9 are turned into lug bosses on lateral surfaces of the fixing lugs 71 of the fixed rings 7, and the lug bosses are designed into triangular structures, so that component manufacturing efficiency is greatly improved, meanwhile, a reinforcing function for the fixed rings is realized, and bending performance of the fixed rings is enhanced. That is: the fixed rings 7 are integrated with original small movable gaskets (regulation blocks 9), the triangular lug bosses 75 are arranged at positions where the small gaskets are originally mounted (i.e., positions, where the fixing lugs 71 are arranged, on peripheral edges of the fixed rings 7), and the small fixing holes 73 are also formed in the triangular lug bosses 75. From FIG. 13, it can be seen that the triangular lug bosses 75 protrude outwards in a way of clinging to circumferential surfaces at the fixing lugs 71 perpendicularly to the circumferential direction. From FIG. 15 and FIG. 16, it can be seen that each fixed ring 7 is fixedly connected with eight connecting rods 10 through the eight fixing lugs 71 and the eight triangular lug bosses 75 on the same circumference, and two ends of each connecting rod 10 are fixedly mounted on a sludge inlet tank 11 and a sludge discharging tank 5 respectively. A plurality of fixed rings 7 are assembled together through fixing bolts (i.e., connecting rods 10), meanwhile, only one movable ring 8 requires to be assembled between every two adjacent fixed rings 7, and no small movable gaskets (regulation blocks 9) require to be mounted, so that assembling operations and a mistaken assembling phenomenon are greatly reduced, and production efficiency is greatly improved. The lug bosses on the fixed rings are designed into the triangular structures, so that the advantages of stable structure and large support area are achieved, and deformation of two fixed rings may be effectively controlled; and meanwhile, the reinforcing function for the fixed rings is realized, and the bending performance of the fixed rings is enhanced.

A lamination of the multi plate screw press sludge dewatering machine of the present embodiment includes fixed rings 7 and movable rings 8, which are all made from a CFRP composite material; and a mass proportion of various components in the CFPR composite material is as follows:

| Component | Proportion/parts by mass |
|---|---|
| POM resin (homopolymerized) | 60 |
| Carbon fiber | 20 |
| PTFE | 20 |
| Oily water repellent | 0.2 |
| Coupling agent | 0.3 |
| Color masterbatch | 0.2 |

The CFRP composite material is prepared from the foregoing components taken as raw materials by proportioning, mixing and twin-screw extrusion and granulation; and the lamination of the multi plate screw press sludge dewatering machine is obtained by performing injection molding on the CFRP composite material.

Operating conditions for the injection molding process are as follows: a material drying temperature is 88° C., material drying time is 4.5 hours, an injection molding temperature is 185° C., injection molding pressure is 95 pa, and a mold temperature is 88° C.

Embodiment 4

Multi plate screw press sludge dewatering machine of the present invention in the present embodiment is basically the same as that in embodiment 3, and the difference is as follows.

A helical shaft of a multi plate screw press sludge dewatering part 1 adopts a variable frequency motor as driving power. A flocculation mixing part 3 is provided with no stirring paddle, and a pipeline mixer is adopted to mix a chemical and sewage.

A lamination of the multi plate screw press sludge dewatering machine of the present embodiment includes fixed rings 7 and movable rings 8, which are all made from a CFRP composite material; and a mass proportion of various components in the CFPR composite material is as follows:

| Component | Proportion/parts by mass |
|---|---|
| POM resin (homopolymerized) | 90 |
| Carbon fiber | 30 |
| PTFE | 5 |
| Oily water repellent | 0.35 |
| Coupling agent | 0.35 |

The CFRP composite material is prepared from the foregoing components taken as raw materials by proportioning, mixing and twin-screw extrusion and granulation; and the lamination of the multi plate screw press sludge dewatering machine is obtained by performing compression molding on the CFRP composite material.

Embodiment 5

Multi plate screw press sludge dewatering machine of the present invention in the present embodiment only includes a multi plate screw press sludge dewatering part 1 and includes no flocculation mixing part 3 and rapid filtering part 2.

The multi plate screw press sludge dewatering part 1 is completely the same as that in embodiment 3.

Embodiment 6

Multi plate screw press sludge dewatering machine of the present invention in the present embodiment only includes a multi plate screw press sludge dewatering part 1 and a rapid filtering part 2 and includes no flocculation mixing part 3.

The multi plate screw press sludge dewatering part 1 and the rapid filtering part 2 are completely the same as those in embodiment 4.

Performance Test Example

Material performance test data of the CFRP composite material in embodiments 1-6 of the present invention is shown in the following table.

| Performance item | | Test condition [state] | Test method | Embodiment 1 | Embodiment 2 | Embodiments 3 and 5 | Embodiments 4 and 6 |
|---|---|---|---|---|---|---|---|
| Basic performance | Water absorption | 24-hour impregnation | ASTM D-570 | 0.27% | 0.27% | 0.27% | 0.27% |
| Physical performance | Mold shrinkage | 3.2 mm | — | 1.9-2.2% | 1.9-2.2% | 1.9-2.2% | 1.9-2.2% |
| | Specific gravity | — | ASTM D-792 | 1.59 | 1.59 | 1.59 | 1.59 |
| Mechanical performance | Tensile strength | 23° C. | ASTM D-638 | 167 | 168 | 180 | 180 |
| | Bending modulus | 23° C. | ASTM D-790 | 13,500 MPa | 13,600 Pa | 18,000 | 18,000 |
| | Bending strength | 23° C. | ASTM D-790 | 193 MPa | 193 MPa | 200 | 205 |
| | Impact strength | Nick side | ASTM D-256 | 82 J/m2 | 70 J/m2 | 53 J/m2 | 53 J/m2 |
| | | Non-nick side | ASTM D-256 | 580 J/m2 | 520 J/m2 | 380 J/m2 | 380 J/m2 |
| | Friction coefficient | VS. Metal-Dynamic | ASTM D-1894 | ≤0.2 | ≤0.2 | ≤0.2 | ≤0.2 |
| | | VS. Metal-Static | ASTM D-1894 | | ≤0.3 | ≤0.3 | ≤0.3 |

-continued

| Performance item | | Test condition [state] | Test method | Embodiment 1 | Embodiment 2 | Embodiments 3 and 5 | Embodiments 4 and 6 |
|---|---|---|---|---|---|---|---|
| Electrical performance | Dielectric factor | 50% RH, 23° C., 106 Hz | ASTM D-150 | 0.006 | 0.006 | 0.006 | 0.006 |
| Thermal performance | Pyrophorisity | — | UL 94 | HB | HB | HB | HB |
| | Thermal distortion temperature | 1.8 MPa | ASTM D-648 | 163° C. | 163° C. | 163° C. | 163° C. |

From the foregoing table, it can be seen that the CFRP composite material used in embodiments 1-6 of the present invention has the properties of high strength, high modulus, low density, low friction coefficient, abrasion resistance, corrosion resistance, fatigue resistance, creep resistance, low thermal expansion coefficient, high water resistance and the like. According to the multi plate screw press sludge dewatering machine in embodiments 1-6 of the present invention, the CFRP composite material is adopted to manufacture the fixed rings 7 and the movable rings 8, and the service life of the movable rings and the fixed rings may be prolonged to 5 to 8 years.

What is claimed is:

1. A lamination of multi plate screw press sludge dewatering machine, comprising fixed rings and movable rings, wherein each fixed ring consists of an annular main body and a plurality of fixing lugs extending from the annular main body along a circumferential direction, and a small hole is formed in each fixing lug; and a triangular lug boss or circular lug boss protruding outwards perpendicularly to the circumferential direction is further arranged at each fixing lug, and a small hole corresponding to the small hole in each fixing lug is also formed in each triangular lug boss or the circular lug boss, wherein the fixed rings and the movable rings are all made from a carbon fiber reinforced plastics (CFRP) composite material, wherein a mass proportion of various components in the CFPR composite material is as follows:

| Component | Proportion/parts by mass |
|---|---|
| Polyoxymethylene (POM) resin | from 60 to 100 |
| Carbon fiber | from 20 to 30 |
| Polytetrafluoroethylene (PTFE) | from 5 to 20 |

-continued

| Component | Proportion/parts by mass |
|---|---|
| Oily water repellent | from 0.2 to 0.5 |
| Coupling agent | from 0.3 to 0.4 |
| Color masterbatch | from 0 to 0.4 | wherein the POM resin is a homopolymer of POM; the carbon fiber is a polyacrylonitrile (PAN)-based carbon fiber or an asphalt-based carbon fiber; the coupling agent comprises four major categories including an organic chromium complex, silanes, titanates and an aluminate compound; and the oily water repellent is an oily waterproof material containing silicone oil and a silicon resin.

2. The lamination of the multi plate screw press sludge dewatering machine according to claim 1, wherein the CFRP composite material is prepared from the foregoing components taken as raw materials by proportioning, mixing and twin-screw extrusion and granulation; and the fixed rings and movable rings of the multi plate screw press sludge dewatering machine are obtained by performing injection molding or compression molding on the CFRP composite material.

3. The lamination of the multi plate screw press sludge dewatering machine according to claim 2, wherein operating conditions for an injection molding process are as follows: a material drying temperature is in a range between 85-90° C., material drying time is in a range between 4-5 hours, an injection molding temperature is in a range between 170-200° C., injection molding pressure is in a range between 90-100 pa, and a mold temperature is in a range between 85-90° C.

4. Multi plate screw press sludge dewatering machine adopting the lamination according to claim 1.

* * * * *